(12) United States Patent
Caye et al.

(10) Patent No.: US 8,825,231 B2
(45) Date of Patent: Sep. 2, 2014

(54) METHOD AND SYSTEM FOR PILOTING A FLYING CRAFT WITH REAR PROPULSION UNIT

(75) Inventors: Paul Caye, Courdimanche (FR); James Caillaud, Maisons Lafitte (FR); Guillaume Laporte, Triel sur Seine (FR)

(73) Assignee: Astrium SAS, Suresne (FR)

( * ) Notice: Subject to any disclaimer, the term of this patent is extended or adjusted under 35 U.S.C. 154(b) by 0 days.

(21) Appl. No.: 13/981,746

(22) PCT Filed: Jan. 20, 2012

(86) PCT No.: PCT/FR2012/050125
§ 371 (c)(1),
(2), (4) Date: Jul. 25, 2013

(87) PCT Pub. No.: WO2012/101363
PCT Pub. Date: Aug. 2, 2012

(65) Prior Publication Data
US 2013/0311010 A1 Nov. 21, 2013

(30) Foreign Application Priority Data

Jan. 26, 2011 (FR) ..................................... 11 00230

(51) Int. Cl.
*F41G 7/00* (2006.01)

(52) U.S. Cl.
USPC ................... 701/3; 701/4; 244/3.1; 244/3.15; 244/3.2; 244/3.21; 244/3.24; 244/3.29; 244/12.4; 244/23 D; 244/51; 244/75.1; 244/76 R; 244/76 J

(58) Field of Classification Search
None
See application file for complete search history.

(56) References Cited

U.S. PATENT DOCUMENTS

| | | | | | |
|---|---|---|---|---|---|
| 3,142,153 | A | * | 7/1964 | Hensley | 239/265.35 |
| 3,486,698 | A | * | 12/1969 | Cologna | 239/265.25 |
| 3,764,091 | A | * | 10/1973 | Crowhurst | 244/3.22 |
| 4,044,970 | A | * | 8/1977 | Maudal | 244/3.22 |
| 4,274,610 | A | * | 6/1981 | Bastian | 244/3.22 |
| 4,350,297 | A | * | 9/1982 | Martin | 239/265.35 |
| 4,364,530 | A | * | 12/1982 | Ripley-Lotee et al. | 244/3.22 |
| 4,424,948 | A | | 1/1984 | Muhlfelder et al. | |
| 4,623,106 | A | * | 11/1986 | Price et al. | 244/3.1 |
| 4,844,380 | A | * | 7/1989 | Peoples et al. | 244/3.22 |
| 5,016,836 | A | | 5/1991 | Thouron | |
| 5,259,569 | A | * | 11/1993 | Waymeyer et al. | 244/3.22 |
| 5,435,503 | A | * | 7/1995 | Johnson et al. | 244/3.15 |
| 5,507,453 | A | * | 4/1996 | Shapery | 244/12.5 |
| 5,647,558 | A | * | 7/1997 | Linick | 244/3.11 |
| 5,806,804 | A | | 9/1998 | Goodzeit et al. | |
| 5,875,993 | A | * | 3/1999 | Weiss et al. | 244/3.22 |
| 6,138,945 | A | * | 10/2000 | Biggers et al. | 244/3.22 |
| 6,279,314 | B1 | * | 8/2001 | Valentian et al. | 60/202 |
| 6,347,262 | B1 | * | 2/2002 | Smay et al. | 701/13 |

(Continued)

*Primary Examiner* — Jonathan M Dager
(74) *Attorney, Agent, or Firm* — Duane Morris LLP; J. Rodman Steele; Gregory M. Lefkowitz

(57) ABSTRACT

A method and system for piloting a craft with a rear propulsion unit are disclosed. The method can include a servo loop where the attitude ($\theta_M$) of the craft (1) is measured in the vicinity of the rear end (1R) of the craft, then the orientation ($\beta$) of the propulsion means (2), which can be oriented relative to the rear end (1R), is adjusted as a function of the attitude measurement ($\theta_M$) in such a way that the craft (1) is stabilized on its flight path.

5 Claims, 3 Drawing Sheets

(56) References Cited

U.S. PATENT DOCUMENTS

| | | | |
|---|---|---|---|
| 6,610,971 B1* | 8/2003 | Crabtree | 244/3.1 |
| 6,948,307 B2* | 9/2005 | Berdoyes et al. | 60/232 |
| 7,012,233 B2* | 3/2006 | Brown et al. | 244/3.1 |
| 7,416,154 B2* | 8/2008 | Bittle et al. | 244/3.22 |
| 7,872,215 B2* | 1/2011 | Blackburn | 244/3.22 |
| 7,975,467 B2* | 7/2011 | Cho et al. | 60/232 |
| 8,387,360 B2* | 3/2013 | Kinsey et al. | 60/229 |
| 2001/0044680 A1* | 11/2001 | Lemelson et al. | 701/3 |
| 2003/0042355 A1* | 3/2003 | Rodden et al. | 244/3.21 |
| 2003/0070417 A1* | 4/2003 | Plumpe, Jr. | 60/230 |
| 2005/0072876 A1* | 4/2005 | Ducasse | 244/23 D |
| 2007/0078575 A1* | 4/2007 | Wilson et al. | 701/21 |
| 2007/0125289 A1* | 6/2007 | Asfar et al. | 114/312 |
| 2008/0203189 A1* | 8/2008 | Cho et al. | 239/265.35 |
| 2009/0072076 A1* | 3/2009 | Brinkerhoff et al. | 244/3.22 |
| 2009/0157363 A1* | 6/2009 | Barnes et al. | 703/8 |
| 2010/0237165 A1* | 9/2010 | Krueger | 239/11 |
| 2010/0297896 A1* | 11/2010 | Duncan | 440/52 |
| 2010/0327106 A1* | 12/2010 | Brinkerhoff et al. | 244/3.22 |
| 2012/0018572 A1* | 1/2012 | Shai | 244/39 |
| 2012/0275905 A1* | 11/2012 | Ambrose | 415/148 |
| 2012/0298806 A1* | 11/2012 | Yamasaki | 244/195 |

* cited by examiner

METHOD AND SYSTEM FOR PILOTING A FLYING CRAFT WITH REAR PROPULSION UNIT

CROSS-REFERENCE TO RELATED APPLICATIONS

This application is a §371 national stage entry of International Application No. PCT/FR2012/050125, filed Jan. 20, 2012, which claims priority to French Patent Application No. 1100230 filed Jan. 26, 2011, the entire contents of which are incorporated herein by reference.

FIELD OF THE INVENTION

Background of the Invention

The present invention relates to a method and a system for piloting a flying craft with a rear propulsion unit.

It is known that a flying craft, such as a space launcher, can be piloted by at least one orientable propulsion unit mounted at the rear end of the craft. This propulsion unit is arranged so as to apply the craft with thrust, the intensity and orientation of which determine the flight path of the craft.

It is also known that an inertial unit is generally disposed in the front portion of such flying craft, one function of the inertial unit being to measure the attitude of the craft, i.e. its orientation relative to inertial (reference) axes integrated in the inertial unit. In particular, a computer deduces therefrom the orientation to be given to the rear propulsion unit so that the thrust it applies allows the craft to be guided and stabilised on a flight path. This orientation is applied to the rear propulsion unit by means of a servo loop, the control law of which conventionally defines the relation between the orientation of the thrust that the propulsion unit has to apply to the craft and the attitude of said craft measured at the inertial unit.

A flying craft thus equipped is capable of being piloted in flight, in real time, so that its path can be controlled and stabilised regardless of the flight conditions (atmospheric, orbital, etc.).

However, the structure of this type of craft generally has rigidity that is not infinite, such that it is likely to undergo oscillatory elastic deformations. These deformations disturb the control law governing the servo loop of the craft, on the one hand, in accordance with modes with different frequencies and damping. Moreover, the disturbance of the control law can lead to destabilisation of the craft.

In order to stabilise this craft in relation to such deformation modes, filtering the orientation control of the propulsion unit is known, which is determined by a computer as a function of the prior attitude measurement of the craft, provided by the inertial unit, such that said modes are attenuated.

Similarly, filtering the orientation control of the propulsion unit is known, which is determined by the computer, so as to oppose, on the one hand, said orientation of the propulsion unit and, on the other hand, the deformation caused by a mode at a given frequency.

However, these prior filtering techniques cannot be applied when the frequencies of the deformation modes are the same order of magnitude as the pass-band intended for piloting (for example, the pass-band required for the stability of the craft). In particular, when the deformation of the craft has a first mode frequency located in the pass-band required for stability, it is likely that said craft cannot be piloted, since it is forced to simultaneously fulfil, on the one hand, the requirements for controlling the overall movement of the craft (referred to as "rigid" mode) and, on the other hand, the stability requirements of the deformation modes (flying craft not perfectly rigid, elastic deformation).

BRIEF SUMMARY OF THE INVENTION

Therefore, the subject of the present invention is a method for piloting a flying craft using propulsion means that can be oriented relative to the rear end of the craft, which allows the craft to be guided and stabilised regardless of the flight conditions, including when the craft is subject to stresses likely to elastically deform, in an oscillatory manner, the structure of said craft according to different modes.

To this end, according to the invention, the method for piloting a flying craft, by propulsion means that can be oriented relative to the rear end of the craft, according to which method, in accordance with a servo loop, the attitude of the craft is measured and the orientation of the propulsion means is adjusted as a function of the attitude measurement so as to stabilise the craft on its flight path, is noteworthy in that the attitude of the craft is measured in the vicinity of the rear end of said craft.

In this way, by virtue of the invention, the propulsion means are controlled and the attitude of the craft is measured at points located in the same vicinity. The result is that the attitude thus measured at least substantially corresponds to the attitude that needs to be given to the craft and therefore can be used directly to control the propulsion means, without needing to adapt the attitude measured between the front portion and the rear end of the craft, which is likely to disturb the control law of the craft.

Thus, by carefully positioning attitude measurement means, the disturbance (caused by the deformation modes) of the control law of the craft is controlled in a more efficient manner.

Furthermore, it will be noted that the invention particularly allows a degree of freedom to be lost with regard to the stabilisation of the craft and grants latitude in terms of its level of rigidity. In this way, the design constraints, and more specifically the stiffness constraints, of the craft can be relaxed, so that manufacture of the craft is simplified even further.

If, according to the invention, the attitude of the craft can be measured at the rear end of the craft, it will be appreciated that it is even better, given the elastic deformation of the structure of the craft, for the measurement to be carried out as close as possible to the point around which the propulsion means articulate.

In order to improve the stabilisation of the craft, when adjusting the orientation of the propulsion means, the angular and linear deformations at the rear end of said craft and at the location of the attitude measurement are taken into account.

In this case, in order for the deformation modes to be controlled naturally, the location of the attitude measurement is determined in such a way that, regardless of the deformation of said craft, the angular deformation at the location of said measurement and the linear deformation at the rear end of said craft have opposite signs.

As a variant, when, for a given deformation of the craft, the angular deformation at the location of the attitude measurement and the linear deformation at the rear end of said craft are the same sign, the orientation of the propulsion means is adjusted taking into account said sign.

Preferably, the attitude measurement and the adjustment of the orientation of the propulsion means are successively carried out within a very short time period. This ensures that, within the time period between the attitude measurement and the adjustment of the orientation of the propulsion means, the angular deformation at the location of said measurement and the linear deformation at the rear end of the craft have not changed signs.

The invention further relates to a system for piloting a flying craft, comprising propulsion means that can be oriented relative to the rear end of the craft, means for measuring the attitude of said craft, as well as means for adjusting the orientation of said propulsion means as a function of said attitude measurement, in such a way as to guide said craft along a stable path, this system being noteworthy in that said means for measuring the attitude of the flying craft are located in the vicinity of the rear end of said craft.

BRIEF DESCRIPTION OF THE DRAWINGS

The figures in the appended drawing will clearly demonstrate how the invention can be implemented. In these figures, identical references designate similar elements.

DETAILED DESCRIPTION OF THE INVENTION

Figure 1:
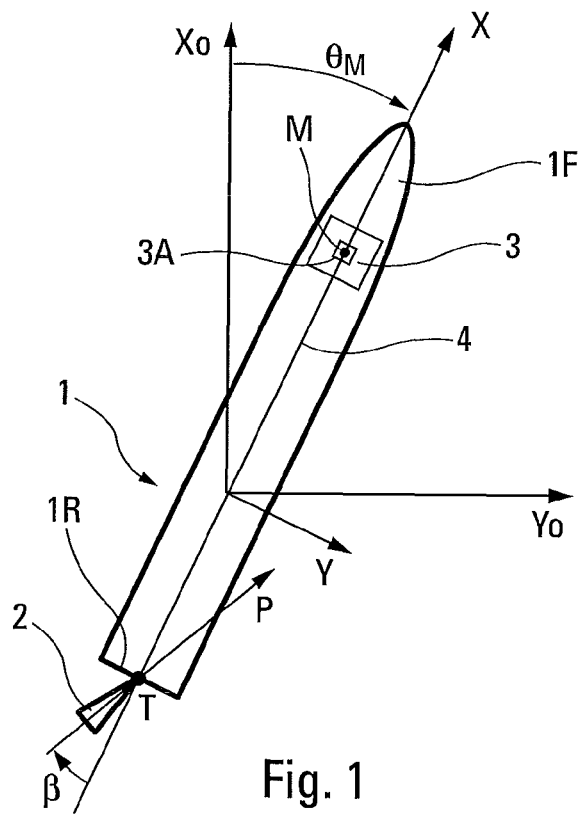
FIG. 1 is a drawing showing a known system for piloting a craft, in a thrust-neutral axis plane of the craft.

The known type of flying craft 1, for example, a space launcher, shown in FIG. 1 is provided with propulsion means 2 designed to orient a thrust P at the rear end 1R of said craft. These propulsion means 2 can be oriented and articulated around an articulation point T located at said end 1R of the craft, such that said thrust P can be oriented around said articulation point T. In FIG. 1, the orientation of the thrust relative to the longitudinal axis X of said craft is shown by the angle β. The guidance of the craft 1 along a path (not shown) is obtained in a known manner by adjusting the angle β relative to inertial axes Xo and Yo.

The role of controlling the path of the craft 1 is then to direct the longitudinal axis X of said craft 1 in the desired direction, relative to the inertial axes Xo and Yo, by influencing the control of the angle β.

In order to control the thrust as a function of the desired flight path, the position and attitude of the craft 1 need to be determined in real time. To this end, the craft 1 is provided in a known manner with an inertial unit 3 located at the point M, in the front portion 1F of the craft. This unit 3 records, on launch of the craft, the inertial axes Xo and Yo that act as references for said unit 3. Thereafter, when the craft 1 moves, the unit 3 measures, by means of a measurement means 3A, the attitude θM of said craft (determined by the X and Y axes of the craft at the unit 3) relative to the inertial axes Xo and Yo, then a computer deduces therefrom the deflection of the thrust means 2 (which determine the orientation β of the thrust applied to the craft) in such a way that the craft follows the desired flight path, which path must in particular be stable.

In FIG. 1, it has been assumed that the craft 1 has infinite rigidity such that its neutral axis 4 coincides with the longitudinal axis X. The general control law applicable to the thrust means 2 is thus conventionally expressed (θ being the difference between the measured attitude θM and the target attitude θR):

$$\beta = \lambda_\theta \theta + \lambda_{\dot\theta} \dot\theta + \lambda_{f_\theta} \smallint \theta \quad \text{(Equation 1)}$$

Figure 2:
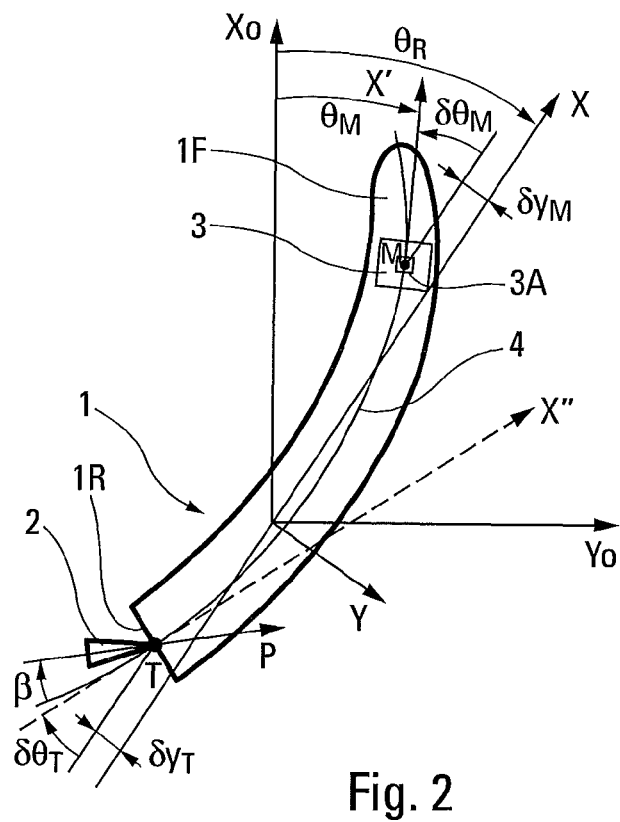
FIG. 2 shows the known piloting system of FIG. 1 in the event that said craft experiences oscillatory elastic deformations (amplified in an exaggerated manner in FIG. 2).
Figure 5:
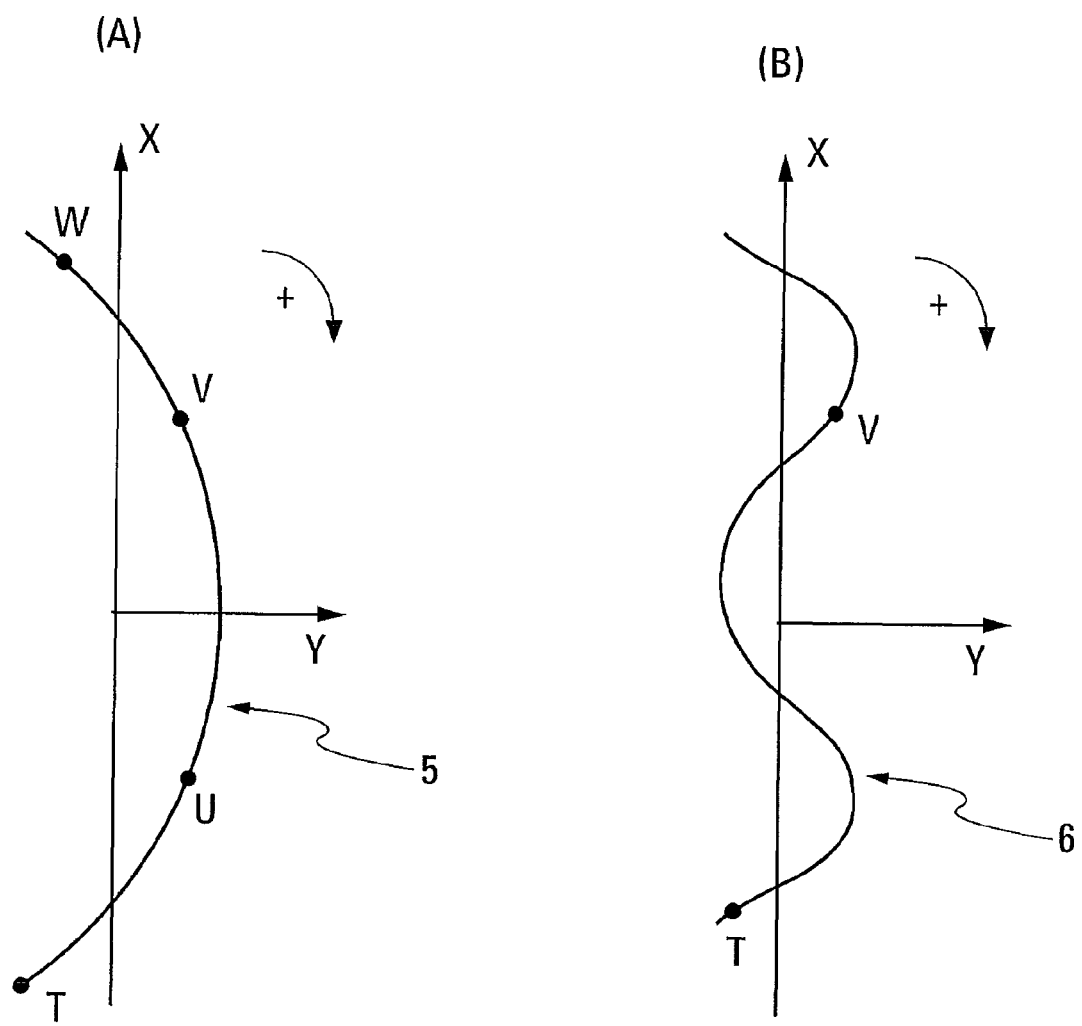
FIG. 5 shows the deformation modes of the craft.

However, as shown in an exaggerated manner in FIG. 2, the structure of the craft 1 is not infinitely rigid and is thus likely to elastically deform under the effect of oscillatory stresses. These deformations have modes of different frequencies, two of which are shown in FIG. 5 (the first order mode in drawing A and a higher order mode in drawing B). In FIG. 2, the craft 1 (and its neutral axis 4) have a regular curvature, such that this first order mode is the main mode of the deformation.

The measurement carried out by the measurement means 3A of the inertial unit 3 allows the attitude θM of the craft to be deduced at this location, this attitude θM corresponding to the angular deviation between the axis X' of the craft (apparent axis of said craft at the point M of the measurement) and the inertial axis Xo. On the basis of this information, the computer deduces the orientation β to be given to the propulsion means 2 relative to the axis X" of the craft (apparent axis of said craft at the articulation point T). However, due to the deformation of the craft, the apparent axis X' (of the craft at the location M of the measurement by the measurement means 3A of the inertial unit 3) and the apparent axis X" (of said craft at the articulation point T) are not parallel to each other or to the neutral axis 4 of the craft.

This results in the appearance of:

- an angular deformation δθM of the craft 1, at the point M of the measurement, relative to the neutral axis 4 of said craft;
- a linear deformation δyM of the craft 1, at the point M of the measurement, relative to the neutral axis 4 of said craft;
- an angular deformation δθT of the craft 1, at the articulation point T of the thrust, relative to the neutral axis 4 of said craft; and
- a linear deformation δyT of the craft 1, at the articulation point T, relative to the neutral axis 4 of said craft.

Each deformation mode has a pulse ω and a damping coefficient ξ. Therefore, the influence of the deformation of the structure of the craft, for the $N^{th}$ deformation mode, can be expressed in the form of the following system of equations:

$$\delta y_M(t) = \delta y_{M,0} \cdot q(t) \quad \text{(Equation 2)}$$

$$\delta \theta_M(t) = \delta \theta_{M,0} \cdot q(t) \quad \text{(Equation 3)}$$

$$\delta y_T(t) = \delta y_{T,0} \cdot q(t) \quad \text{(Equation 4)}$$

$$\delta \theta_T(t) = \delta \theta_{T,0} \cdot q(t) \quad \text{(Equation 5)}$$

Where q is the solution of the following equation:

$$\ddot{q}(t) + 2\xi\omega\dot{q}(t) + \omega^2 q(t) = \mu \delta y_{T,0} \beta \quad \text{(Equation 6)}$$

The solution of which provides the new command law:

$$\beta = \lambda_\theta \theta + \lambda_{\dot\theta}\dot\theta + \lambda_{f_\theta}\smallint \theta + \delta\theta_{M,0}(\lambda_\theta q + \lambda_{\dot\theta}\dot q + \lambda_{f_\theta}\smallint q) \quad \text{(Equation 7)}$$

Compared with the conventional command law defined in equation 1, the aforementioned command law comprises an additional component $\delta\theta_{M,0}(\lambda_\theta q + \lambda_{\dot\theta}\dot q + \lambda_{f_\theta}\smallint q)$ that expresses the disruption of the closed servo loop by the elastic deformation of the craft 1.

Figure 3:
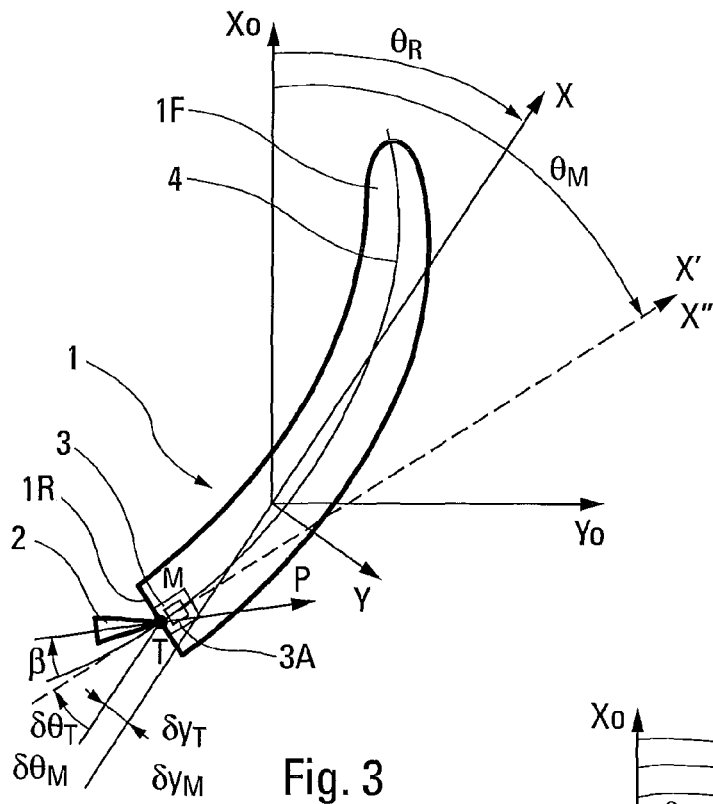
FIG. 3 is a drawing showing the piloting system according to the present invention, in a similar situation to that of FIG. 2.

In order to stabilise each elastic deformation mode, the measurement means 3A is, according to the invention, positioned in the vicinity of the point T around which the thrust means 2 are articulated. This situation is shown in FIG. 3.

It will be noted that the development shown in this case is a deviation model, comprising conventional abuses in notation (θ is taken together with Δθ, θM with ΔθM, Δβ with β).

Therefore, the attitude performance of the craft 1 is then governed in the first order by the following four equations:

$$\ddot\theta = K_\theta \theta + K_\beta \beta \quad \text{(Equation 8)}$$

$$\theta_M = \theta + h'q \quad \text{(Equation 9)}$$

$$\ddot{q} + 2\xi\omega\dot{q} + \omega^2 q = -P\omega^2 h\beta \quad \text{(Equation 10)}$$

$$\beta = \lambda_\theta \theta_M + \lambda_{\dot\theta} \dot\theta_M \quad \text{(Equation 11)}$$

Where:
θ represents the attitude of the craft 1;
β represents the orientation of the thrust P;
$\theta_M$ represents the attitude effectively measured by the measurement means 3A of the inertial unit 3;
h' represents the modal angular deformation at the measurement point M;
h represents the modal linear deformation at the articulation point T;
q represents the deformation mode (in generalised coordinates);
$K_\theta$ represents the attitude stiffness of the craft, in an open loop;
$K_\beta$ represents the deflection efficiency of the propulsion means 2 in terms of angular acceleration;
ξ represents the damping of the deformation mode;
ω represents the pulse of the deformation mode;
P represents the thrust;
$\lambda_\theta$ represents the attitude gain of the piloting system; and
$\lambda_{\theta'}$ represents the attitude speed gain of the piloting system.

The dynamic imposed by the closed servo loop then leads to the following adjustment to the piloting system:

$$\lambda_\theta = -\frac{K_\theta + \omega_{BF}^2}{K_\beta} \quad \text{(Equation 12)}$$

$$\lambda_{\theta'} = -\frac{2\xi_{BF}\omega_{BF}}{K_\beta} \quad \text{(Equation 13)}$$

Where:
$\omega_{BF}$ represents the pulse of the closed loop rigid mode; and
$\xi_{BF}$ represents the damping of the closed loop rigid mode.

Without influencing the scope of the invention, it is assumed that the craft does not have stiffness (i.e. $K_\theta = 0$) and that the mode is not damped (i.e. ξ=0). It will be noted that a calculation similar to the following calculation can be obtained without these assumptions, insofar as the stiffness $K_\theta$ only modifies the value of the piloting gains in order to achieve the dynamic ($\omega_{BF}$; $\xi_{BF}$) that is imposed on the closed loop. Furthermore, it follows that non-zero damping of the modes (thus positive as the mechanical system is dissipative) has a beneficial effect in terms of the stability of the craft.

With the aforementioned assumptions, and by designating the Laplace variable as s, the denominator of the closed loop transfer function can be expressed in the form of the following polynomial:

$$s^4 + 2\xi_{BF}\omega_{BF}(1+v\omega^2)s^3 + (\omega^2 + \omega_{BF}^2 + v\omega^2\omega_{BF}^2)s^2 + 2\xi_{BF}\omega_{BF}\omega^2 s + \omega^2\omega_{BF}^2 \quad \text{(Equation 14)}$$

With the following parameter v:

$$v = -\frac{Phh'}{K_\beta} \quad \text{(Equation 15)}$$

The system of equations 8 to 11 (and thus the corresponding deformation mode) is stable only if the roots of the polynomial of equation 14 are negative real parts.

In order to assess the sign of these roots, the Routh Hurwitz criterion can be applied, which makes it possible to deduce that the roots of the polynomial of equation 14 are negative real parts only if the following five coefficients are positive:

$$1 \quad \text{(Equation 16)}$$

$$2\xi_{BF}\omega_{BF}(1+v\omega^2) \quad \text{(Equation 17)}$$

$$\frac{v\omega^4 + \omega_{BF}^2 + 2v\omega^2\omega_{BF}^2 + v^2\omega^4\omega_{BF}^2}{1+v\omega^2} \quad \text{(Equation 18)}$$

$$\frac{2v\xi_{BF}\omega_{BF}\omega^6}{v\omega^4 + \omega_{BF}^2 + 2v\omega^2\omega_{BF}^2 + v^2\omega^4\omega_{BF}^2} \quad \text{(Equation 19)}$$

$$\omega_{BF}^2\omega^2. \quad \text{(Equation 20)}$$

Among the terms of the above coefficients, v is the only parameter for which the sign can be negative. Therefore, according to the Routh Hurwitz criterion, the system is stable if v is positive, i.e. the system is stable if the product h.h' is negative.

It can be derived therefrom that if the angular deformation h' at the measurement point M and the linear deformation h at the articulation point T are opposite signs, then, regardless of the closed loop adjustment ($\omega_{BF}$; $\xi_{BF}$) of the piloting system, the considered deformation mode is stable.

This situation is shown in FIG. 5. In drawing A of FIG. 5, the curve 5 represents the neutral axis of the craft 1 relative to the longitudinal axis X when said craft is elastically deformed only according to the first order mode.

Points T, U, V and W are shown as examples of possible positions for the measurement point M. It thus becomes apparent that:
for the articulation point T, the angular h' and linear h deformations are definitely opposite signs (h' positive, h negative);
for the point U, the angular h' and linear h deformations are not opposite signs (h' and h positive);
for the point V, the angular h' and linear h deformations are definitely opposite signs (h' negative, h positive); and
for the point W, the angular h' and linear h deformations are not opposite signs (h' and h negative).

The stability therefore would only be able to be assured if the attitude measurement is carried out either at the point T or at the point V.

In drawing B of the same FIG. 5, the curve 6 represents the neutral axis of the craft 1 relative to the axis X when this is elastically deformed only according to an order mode higher than the first order mode. In this case it can be seen that:
for the point T, the angular h' and linear h deformations are always opposite signs (h' positive, h negative); and
for the point V, the angular h' and linear h deformations are no longer opposite signs (h' negative, h positive).

Only the point T thus allows stability to be assured for these two order modes. It is noteworthy that a similar argument for other orders will lead to the same result. In this way, as the elastic deformation experienced by the structure of the craft 1 is a combination of several modes, such as those in drawings A and B of FIG. 5, it follows that the point T is the best location for measuring the attitude $\theta_M$ of the craft 1, so that the stability is assured for all of the orders of deformation.

It will be appreciated that it is nevertheless not necessary for the point M to perfectly coincide with the point T in order for the invention to allow the required stabilisation, given that the point M can be located at least approximately in the vicinity of the rear end 1R of the craft 1 for all of the order modes to be stabilised.

It will also be appreciated that, by virtue of a stabilisation of all the modes by the simple repositioning of the means 3A for measuring the attitude $\theta_M$ of the craft 1, this stabilisation occurs in a completely natural manner, i.e. without requiring the addition of additional means for filtering the orientation $\beta$ that have to take into account residual deformation faults.

Figure 4:
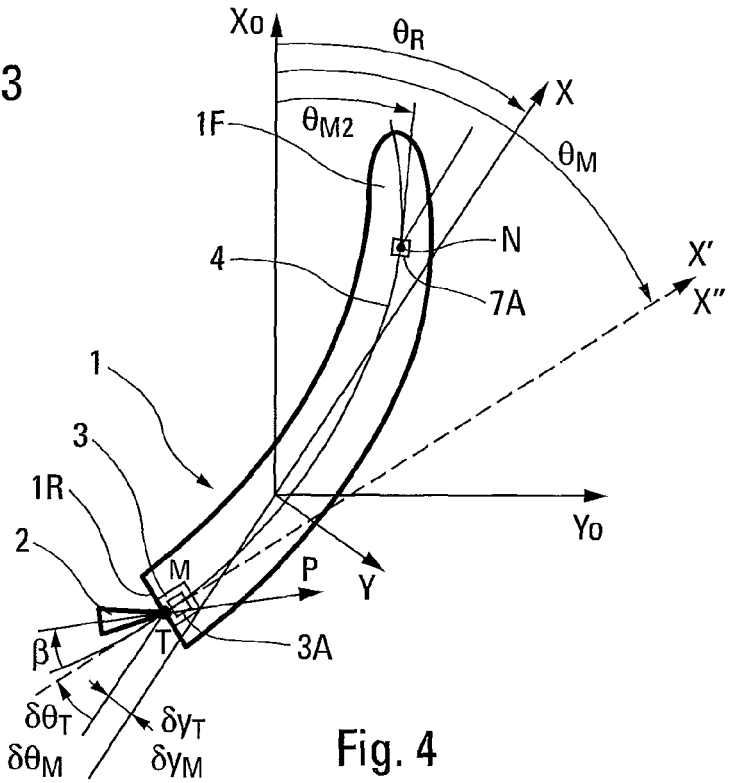
FIG. 4 shows, in a view similar to that of FIG. 3, a variant of the piloting system according to the invention.

As shown in FIG. 4, the craft 1 comprises, in addition to the first measurement means 3A of the inertial unit 3, a second means 7A for measuring the attitude of said craft. This second measurement means 7A, disposed at a point N located in the front portion 1F of the craft (opposite the rear end 1R of said craft), allows, as is the case for the first measurement means 3A, the attitude $\theta_M 2$ of said craft 1 to be measured at the point N, and then the deflection $\beta$ of the thrust means 2 to be deduced therefrom so that said craft 1 follows the desired stable path (not shown).

According to this embodiment of the invention, the measurement means 3A and 7A can operate in an alternative manner as a function of the envisaged flight conditions. In effect, the effect produced by the deformation modes is generally only significant in atmospheric flight conditions. The measurement means 3A of the inertial unit 3 can only be used, at the rear end 1R of the craft, in atmospheric flight conditions, the duration of which is generally short (two to three minutes). With regard to the rest, in particular for space flight and/or navigation flight, the second measurement means 7A is preferably used.

To this end, the second measurement means 7A can be a high precision sensor, which allows the attitude of the craft to be measured with high precision and thus for the precision requirement for navigation to be fulfilled. With regard to the measurement means 3A of the first inertial unit 3, it can be a sensor that is not as precise as that of the second measurement means 7A.

The invention has been described above particularly based on the assumption that there is no delay between the moment the attitude $\theta_M$ measurement is carried out and the moment the deflection $\beta$ controlled by the piloting system (possibly by means of the pilot) is applied. However, it will be noted that a significant delay could result in a change of sign in h and h' between these two moments. With regard to piloting, this situation would be equivalent to h and h' with the same sign, which would no longer allow natural stability to be assured.

However, it will be appreciated that the main deformation modes that are likely to be in the piloting pass-band are low-frequency modes and are thus not very sensitive to the order of magnitude of the potential delay between these two moments in a conventional piloting system.

The invention claimed is:

1. Method for piloting a flying craft (1) by propulsion unit configured to provide said flying craft with thrust, said propulsion unit configured to be oriented relative to the rear end (1R) of said flying craft, according to which method, in accordance with a servo loop:
the attitude ($\theta_M$) of said flying craft (1) is measured, and
the orientation ($\beta$) of said propulsion unit (2) is adjusted as a function of said attitude measurement ($\theta_M$), in such a way as to stabilise said flying craft (1) on its flight path, wherein the attitude ($\theta_M$) of said flying craft (1) is measured in the vicinity of said rear end (1R), wherein, when adjusting the orientation ($\beta$) of said propulsion unit (2), angular ($\delta\theta_M$, $\delta\theta_T$) and linear ($\delta y_M$, $\delta y_T$) deformations at the rear end (1R) of said flying craft (1) and at the location (M) of the attitude measurement ($\theta_M$) are taken into account.

2. Method according to claim 1, wherein the location (M) of the attitude measurement ($\theta_M$) of said flying craft (1) is determined in such a way that, regardless of the deformation of said flying craft, the angular deformation ($\delta\theta_M$) at the location (M) of said attitude measurement and the linear deformation ($\delta y_T T$) at the rear end (1R) of flying said craft are opposite signs.

3. Method according to claim 1, wherein when, for a given deformation of said flying craft (1), the angular deformation ($\delta\theta_M$) at the location (M) of the attitude measurement and the linear deformation ($\delta y_T$) at the rear end (1R) of said flying craft are the same sign, the orientation ($\beta$) of the propulsion unit (2) is adjusted taking into account said sign.

4. The method according to claim 1, wherein the orientation ($\beta$) of said propulsion unit is adjusted relative to a longitudinal axis of said flying craft.

5. The method according to claim 1, wherein the angular orientation ($\beta$) of a longitudinal axis of said propulsion unit is adjusted relative to a longitudinal axis of said flying craft.

* * * * *